United States Patent [19]

Shaw et al.

[11] 4,309,392

[45] Jan. 5, 1982

[54] PROCESS FOR REMOVING NITROGEN OXIDES FROM A GAS STREAM

[75] Inventors: Wilfrid G. Shaw, Lyndhurst; Christos Paparizos, Willowick; Louis J. Velenyi, Lyndhurst, all of Ohio

[73] Assignee: Standard Oil Company, Ohio

[21] Appl. No.: 175,237

[22] Filed: Aug. 5, 1980

[51] Int. Cl.³ .............................................. B01D 53/36
[52] U.S. Cl. ..................................... 423/239; 252/447
[58] Field of Search ................ 423/212, 239; 252/447

[56] References Cited
U.S. PATENT DOCUMENTS 3,810,972  5/1974  Humphrey et al. ................. 252/447

FOREIGN PATENT DOCUMENTS

| 2230257 | 12/1972 | Fed. Rep. of Germany | 252/447 |
| 2635652 | 9/1978 | Fed. Rep. of Germany | 423/239 |
| 50-15754 | 6/1975 | Japan | 252/447 |
| 50-23665 | 8/1975 | Japan | 423/239 |
| 316948 | 10/1930 | United Kingdom | 423/239 |

*Primary Examiner*—George O. Peters
*Attorney, Agent, or Firm*—Joseph G. Curatolo; Herbert D. Knudsen; Larry W. Evans

[57] ABSTRACT

The invention herein is directed toward a process for the conversion of oxides of nitrogen to nitrogen gas by employing a reactant carbon fiber or inter host carbon material at a temperature of about 550° C. The reactant material can be utilized alone or on a support material; in reactors such as fixed bed, fluid bed and radial flow; and, if desired, can be regenerated during the conversion process.

6 Claims, No Drawings

PROCESS FOR REMOVING NITROGEN OXIDES FROM A GAS STREAM

TECHNICAL FIELD

The present invention is directed toward a process for the conversion of common oxides of nitrogen such as nitrogen oxide, nitrogen dioxide and nitrous oxide to nitrogen gas. These oxides of nitrogen arise from various sources such as stack gases, exhaust from internal combustion engines and the decomposition of nitric acid. Whereas existing processes for the conversion of nitrogen oxides have required the use of ammonia, noble metals and high temperatures, the method of the present invention employs a carbon fiber or an inter host carbon particle reactant and temperatures which need not exceed about 550° C.

BACKGROUND ART

Preparation of highly chemically reactive carbon is described in U.S. Pat. No. 1,352,162. The process disclosed provides for the conversion of carbon monoxide to carbon dioxide over a finely divided metal catalyst such as iron, manganese, nickel or cobalt and the like in the virtual absence of air at atmospheric pressure and temperatures of below 700° C. During the conversion, carbon is precipitated upon the catalyst which can be separately collected from the latter by mechanical or magnetic means. The carbon so formed is said to be ashless, highly pure and reactive and suitable for nitrogen fixation processes.

U.S. Pat. No. 1,838,577 is directed toward a process for removal of only traces of oxides of nitrogen together with noxious reactive hydrocarbons from coke oven gas by passing the gas through a filter containing an adsorptive medium. The adsorptive medium is active carbon, the catalytic effect of which is said to be increased by impregnation with metals or metal salts. The patentee further discloses that other materials, such as silica gel, can be employed in lieu of active carbon.

Lastly, U.S. Pat. No. 4,060,589 discloses a process for simultaneously reducing $NO_x$ and $SO_x$ components from stack gases by passing the stack gases over bituminous coke at temperatures between 482° C. and 871° C. Water vapor in the stack gases is said to react with the coke to produce carbon monoxide and hydrogen, the former reacting with the $NO_x$ and the latter reacting with the $SO_2$. The patentees state that although the conversion is not believed to be effected by catalytic means, the coke may contain specific metals, such as iron, which may accelerate the reductions. The process does appear to be operable on $SO_x$ and some of the $NO_x$ present, both of which were present in trace amounts in a synthetic stack gas employed in the examples.

Although the process of the present invention employs carbon, the carbon does not function as an adsorbant, but chemically reacts with the oxides of nitrogen present to form nitrogen gas. To be useful, such a process should be capable of converting large amounts of nitrogen oxides, not just traces, and at temperatures that are not exceedingly high.

DISCLOSURE OF THE INVENTION

It is therefore an object of the present invention to provide a process for the conversion of large amounts of various nitrogen oxide compounds such as NO, $NO_2$, $N_2O_5$ and $N_2O$ with a carbon material chemically reactive therewith.

It is a further object of the present invention to provide a process for the conversion of the aforesaid nitrogen oxides which can be conducted at temperatures of up to about 800° C.

It is another object of the present invention to provide a process for the conversion of the aforesaid nitrogen oxides by employing a carbon material that can be exhausted in a one-time usage or which can be regenerated in situ for extended periods of usage.

It is yet another object of the present invention to provide a process for the conversion of the aforesaid oxides of nitrogen with a relatively cheap compound which does not require the co-feeding of ammonia and which can be readily employed in a variety of gas molecules.

These and other objects, together with the advantages thereof over the prior art, which shall become apparent from the specification which follows are accomplished by our invention as hereinafter described and claimed.

In general the process for the present invention includes the step of passing one or more oxides of nitrogen over a reactant carbon fiber material or inter host carbon particle at a temperature of from about 450° C. to about 750° C. Pressure during the reaction can range from atmospheric to as high as 20 to 30 atmospheres. The process also may be practiced by co-feeding a carbon-containing gas with the oxide of nitrogen in which instance the reactant material can be continually and simultaneously regenerated. Hydrogen gas may also be fed if the carbon-containing gas is not a hydrocarbon.

PREFERRED MODE FOR CARRYING OUT THE INVENTION

The component or reactant utilized in the practice of the subject invention is a carbon fiber structure which comprises carbon and a metal such as iron, nickel or cobalt. The carbon fiber reactant is formed by deposition of carbon over a catalyst or host material. Alternatively, an inter host carbon particle is employed which is grown inside a host material rather than over the host material. For purposes of discussion, the reactant material, whether in the form of carbon fibers or inter host carbon particles, shall be referred to hereinafter as the carbon fiber reactant or just the reactant. Also reference to the reactant being carried by the host can mean either on or in the host as is applicable.

The host material comprises a metal, such as iron, nickel or cobalt, which may be preferentially carried on a support material. Suitable support materials include silica, alumina, titania, silicon carbide, carborundum, zirconia, Alundum, mixtures thereof and the like. In one preparation of the host material, a solution of the metallic salt, e.g., the nitrate, in water is utilized to impregnate an already prepared support. Alternatively, the metallic reagent or reagents and a colloidal support can be spray dried together. Or, a nonsupported form such as an ore, steel wool, metal bar and the like can be employed.

When impregnation of a support is used, it is then calcined at a temperature of about 350° C. and 700° C. for one to six hours to obtain the oxides of the metal. This catalyst is then reduced by the addition of typical reducing agents such as hydrogen or hydrazine. The composition of the catalyst or host material thus formed, by weight percent, comprises from about three to 95 percent metal and from about 97 to five percent support with a 10 to 40 percent-90 to 60 percent composition, respectively, being preferred.

After reduction of the host material, as with hydrogen, carbon fibers are deposited thereon. This is facilitated by passing carbon monoxide, preferably with some hydrogen, or only a hydrocarbon over the host at a temperature of about 450° to 650° C. for about one-half to eight hours. Ratio of the two gases, on a volume basis, hydrogen:carbon monoxide, is from about 0:1 to about 1:2 with 1:5 being preferred. The flow of hydrogen and carbon monoxide or of hydrocarbon can be repeated and interspersed with a separate flow of hydrogen to remove some of the deposited carbon, thereby assisting activation. Although hydrogen is not absolutely necessary, as in the carbon monoxide, its presence facilitates the reaction.

As a result of the foregoing passage of hydrogen and carbon monoxide, carbon is deposited on or in the host material. The composition of the fibers is partially carbon and partially metal from the host, the carbon content of the fibers being from about five to about 98 percent by weight, with 70 to 95 percent being preferred. The carbon is the reactant utilized in the conversion of the nitrogen oxides to nitrogen in the process of the present invention. If the carbon is in the form of fibers, they can be separated from the host material or employed therewith, as they were formed, depending upon the system being employed for the conversion reaction. Inasmuch as the reactant fibers are consumed during the conversion process they have not been referred to as a catalyst.

The reactant carbon fibers can be employed in known reactors for the conversion of the nitrogen oxides, such reactors including but not limited to fixed bed, fluid bed (particularly when the host material is prepared by spray drying), and radial flow. The conversion process involves the step of passing the nitrogen oxide or oxides directly over the reactant carbon fibers in the reactor at a temperature of from about 450° to about 750° C. Residence time of the nitrogen oxide over the carbon fibers will vary depending upon factors such as the type of reactor as well as its size and that of the bed, however, on a mole percent basis it is believed that the carbon fibers can convert approximately one to more than two moles of nitrogen oxide per mole of reactant.

While in the foregoing process, the reactant is eventually consumed and conversion ceases, it is also possible to provide for the continuous and simultaneous regeneration of the reactant carbon fibers where a continuous conversion process would be expeditious. To do so, a stream of carbon-containing gas such as carbon monoxide and preferably some hydrogen is fed with the nitrogen oxides in a ratio of hydrogen to carbon monoxide of about 0:1 to 1:2 and carbon to nitrogen oxide of greater than 1:1. In lieu of carbon monoxide, hydrocarbons such as methane, ethane or other hydrocarbons such as kerosene or naphtha can be employed and require less, or no hydrogen, in the process. As a further variation, the spent host could be removed from the reactor and separately regenerated or the nitrogen oxide flow could be terminated while regeneration is taking place.

In the examples which follow, a volume of an oxide of nitrogen was converted to nitrogen gas. The reactant carbon fiber utilized in the process was prepared by placing a charge of 3.79 g of catalyst or host material, comprising 20% Fe and 80% $SiO_2$, into a quartz tube, 81.28 cm long; 28 mm O.D. and 25 mm I.D. The tube was placed in a 3.175 cm I.D. Hevi Duty split tube furnace 63.5 cm long and was stoppered at each end for gas inlet and outlet.

The quartz tube and its contents were heated to 720° C. Hydrogen was then passed through the tube for one hour at a rate of 49 cc/min to reduce the metal. At this point the catalyst or host material had turned grey. The rate of flow of hydrogen was thereafter decreased and the temperature was lowered to 550° C. and maintained there. Next a mixture of hydrogen (32 cc/min) and carbon monoxide (168 cc/min) was passed through the tube from left to right for 30 minutes and then reversed for another 30 minutes in order to ensure better coverage of the host and satisfactory deposition of the carbon fiber. The flow of combined gas was then terminated and followed by hydrogen only (109 cc/min) from left to right for 30 minutes for activation by removal of some of the deposited carbon. Following this treatment, the flow of hydrogen and carbon monoxide employed earlier was resumed for 30 minutes from left to right. The reactant carbon fibers were then ready for nitrogen oxide conversion, as set forth in the Examples hereinbelow.

EXAMPLES

In the same quartz tube, containing the reactant carbon fibers and host material, a flow of 23 cc/min of the oxide of nitrogen being converted was passed at 550° C. After a 30 minute period, a gas sample was taken from the effluent and analyzed by gas chromatography and was found to be free from the nitrogen oxide while containing a very high mole percent of nitrogen.

In Table I below, the analysis of the effluent gas for three examples, Example 1-nitrogen oxide; Example 2-nitrous oxide, and Example 3-nitrogen dioxide are reported, each being converted as set forth in the preceding paragraph. For purposes of comparison, a Control was run by using 5.872 g of the foregoing Fe-$SiO_2$ catalyst, which was carbon-free. The amount of nitrogen subsequently formed was considerably low with more than 97% nitrogen oxide being found in the effluent. The amount of nitrogen or other gases in the effluent was determined by gas chromatography.

TABLE I

| Example No. | Feed Gas | Conversion of Nitrogen Oxides Effluent Gas (mole %) | | | | | | | |
|---|---|---|---|---|---|---|---|---|---|
| | | $O_2$ | $N_2$ | CO | $CO_2$ | $CH_4$ | NO | $NO_2$ | $N_2O$ |
| Control | NO | 0 | 1.86 | 0 | 0.16 | 0 | 97.98 | — | — |
| 1 | NO | 4.72 | 57.38 | 4.41 | 31.25 | 2.25 | 0 | — | — |
| 2 | $N_2O$ | 9.21 | 42.85 | 30.81 | 14.72[a] | 2.41 | — | — | a |
| 3 | $NO_2$ | 5.75 | 51.04 | 13.56 | 28.61[b] | 0 | 1.04 | b | — | a The retention time of $N_2O$ and $CO_2$ are about the same
b The retention time of $NO_2$ and $CO_2$ are about the same As can be determined from the data in Table I, very high conversions of the various nitrogen oxides to nitrogen gas were obtained. Residual amounts of $N_2O$ and $NO_2$ for Examples 2 and 3 respectively, could not be determined as footnoted, however, the amounts thereof should be zero or very close to zero based upon the high amounts of nitrogen gas formed and present in the effluent gas. Considering the conversion of NO, one mole will react with approximately one-half mole of carbon. At a flow rate of 23 cc/min of NO and assuming a 100% conversion thereof, the carbon reactant would not be totally removed until more than two hours of use.

Based upon these results it is apparent that the process of the present invention is useful for converting nitrogen oxides into nitrogen. The carbon fiber reactant can be utilized to treat a variety of gas streams where oxides of nitrogen are objectionable. One of these for instance could be the nitrogen oxide decomposition products of nitric acid and/or processes. By employing an apparatus containing a specific amount of the reactant carbon fibers, oxides normally encountered when filling or emptying a tank of nitric acid could readily be converted to nitrogen. In this system, regeneration would most likely not be important. Other uses could include the treatment of combustion exhaust gases, stack gases, feed pretreatment, effluent treatment, impurity removal and the like. Depending upon the costs involved as well as the practicality, the process could be tailored for a one-time use or continuous conversion.

As stated hereinabove, the reactant carbon fibers that can be employed in the practice of the process of this invention can contain iron, nickel or cobalt in the amounts disclosed herein. It is to be understood that variations of the disclosure fall within the scope of the claimed invention and that the subject invention is not to be limited by the examples set forth herein. They have been provided merely to provide a demonstration of operability and therefore the selection of metals, reducing agents, carbon-containing gases, host materials and the like, can be determined without departing from the spirit of the invention herein disclosed and described. Moreover, the scope of the invention shall include all modifications and variations that fall within the scope of the attached claims.

We claim:

1. A process for converting oxides of nitrogen to nitrogen gas comprising the step of:
   passing the oxide of nitrogen over a reactant carbon fiber material at a temperature of from about 450° C. to about 750° C.;
   said reactant carbon fiber material comprising a reduced metal, selected from the group consisting of iron, nickel and cobalt, and carbon fibers deposited thereon wherein the carbon content of said fibers is from about five to about 98 percent by weight based upon the weight of said reactant carbon fiber material.

2. A continuous process for converting oxides of nitrogen to nitrogen gas comprising the step of:
   passing the oxide of nitrogen with a carbon-containing gas over a reactant carbon fiber material at a temperature of from about 450° C. to about 700° C.;
   said reactant carbon fiber material comprising a reduced metal, selected from the group consisting of iron, nickel and cobalt, and carbon fibers deposited thereon wherein the carbon content of said fibers is from about five to about 98 percent by weight based upon the weight of said reactant carbon fiber material.

3. A process for converting oxides of nitrogen, as set forth in claim 1 or 2, wherein said reactant carbon fiber material is carried by a host material comprising reduced metal and a support material selected from the group consisting of silica, silicon carbide, alumina, Alundum, zirconia, carborundum and mixtures thereof and wherein said reactant material comprises five to 98 percent by weight carbon and the balance by weight metal.

4. A process for converting oxides of nitrogen, as set forth in claim 2, wherein said carbon-containing gas is selected from the group consisting of carbon monoxide, methane, ethane, kerosene and naphtha and wherein the ratio of hydrogen to carbon-containing gas is from about 0:1 to about 1.2.

5. A process for converting oxides of nitrogen, as set forth in claim 4, wherein the ratio of carbon to nitrogen oxide is greater than 1:1 up to about 2:1.

6. A process for converting oxides of nitrogen, as set forth in claims 1 or 2, wherein conversion of the oxides of nitrogen occurs at a pressure ranging from about one to 30 atmospheres.

* * * * *